United States Patent [19]
Nakamura

[11] Patent Number: 5,673,667
[45] Date of Patent: Oct. 7, 1997

[54] ENGINE KNOCK CONTROL

[75] Inventor: Kazuhiro Nakamura, Hamamatsu, Japan

[73] Assignee: Sanshin Kogyo Kabushiki Kaisha, Hamamatsu, Japan

[21] Appl. No.: 633,942

[22] Filed: Apr. 17, 1996

[30] Foreign Application Priority Data

Apr. 19, 1995 [JP] Japan .................................. 7-119145

[51] Int. Cl.$^6$ .................................................. F02D 43/00
[52] U.S. Cl. .................................................. 123/425
[58] Field of Search .............................. 123/418, 425, 123/339.11, 419, 413

[56] References Cited

U.S. PATENT DOCUMENTS

| | | | |
|---|---|---|---|
| 4,535,739 | 8/1985 | Kudo et al. | 123/425 |
| 4,727,841 | 3/1988 | Hirose et al. | 123/425 |
| 5,050,551 | 9/1991 | Morikawa | 123/425 |

*Primary Examiner*—Andrew M. Dolinar
*Attorney, Agent, or Firm*—Knobbe, Martens, Olson & Bear LLP

[57] ABSTRACT

A number of embodiments of engine knock controls wherein knocking is precluded by retarding the spark timing. In order to improve driveability and smooth engine performance, the amount of fuel supplied is also increased when the spark is retarded to avoid a loss of engine power.

10 Claims, 7 Drawing Sheets

000# ENGINE KNOCK CONTROL

BACKGROUND OF THE INVENTION

This invention relates to an engine knock control and more particularly to an improved way of controlling knock in internal combustion engines while maintaining good engine running.

In the interest of maintaining good engine performance, the spark advance curve for the engine is normally set at an optimal ratio assuming consumption of an optimum fuel. However, under some circumstances the spark may be too advanced, and a condition known as knocking may occur. Therefore, many forms of engine ignition control incorporate knock sensors for sensing when a knocking condition is occurring. When knocking occurs, then the spark is retarded sufficiently so as to avoid the knocking condition.

Although these systems are effective in improving engine performance in avoiding knocking, they give rise to unsatisfactory driveability and performance. The reason for this is that when the spark advance is retarded, the power developed by the engine decreases. The operator senses this and then tends to open the throttle valve further to offset this decrease in power. This then gives rise to driveability problems, not only in the transient condition, but also when the spark is returned to normal because the engine will then speed up because of the larger throttle opening.

It is, therefore, a principal object of this invention to provide an improved knock control system and method for an internal combustion engine.

It is a further object of this invention to provide an improved engine knock control method and system wherein knocking is eliminated or reduced without adversely affecting the power output of the engine.

SUMMARY OF THE INVENTION

This invention is adapted to be embodied in an internal combustion engine and control system therefor. The engine is provided with a combustion chamber and a charge-forming system that supplies a fuel-air charge to the combustion chamber for combustion therein. An ignition system is provided for igniting the charge in the combustion chamber so as to initiate the combustion therein. Controls are provided for controlling the amount of fuel in the fuel-air supply and the timing of the ignition.

In accordance with an engine operating under the invention, a sensor is provided for sensing an engine condition when retarded ignition is called for. The ignition is then retarded, while the amount of fuel supplied by the charge-forming system is increased so as to maintain substantially the same power output.

In accordance with a method for practicing the invention, when a certain engine condition is sensed, the ignition is retarded and the amount of fuel supplied to the engine is increased.

DETAILED DESCRIPTION OF THE PREFERRED EMBODIMENTS OF THE INVENTION

Figure 1:
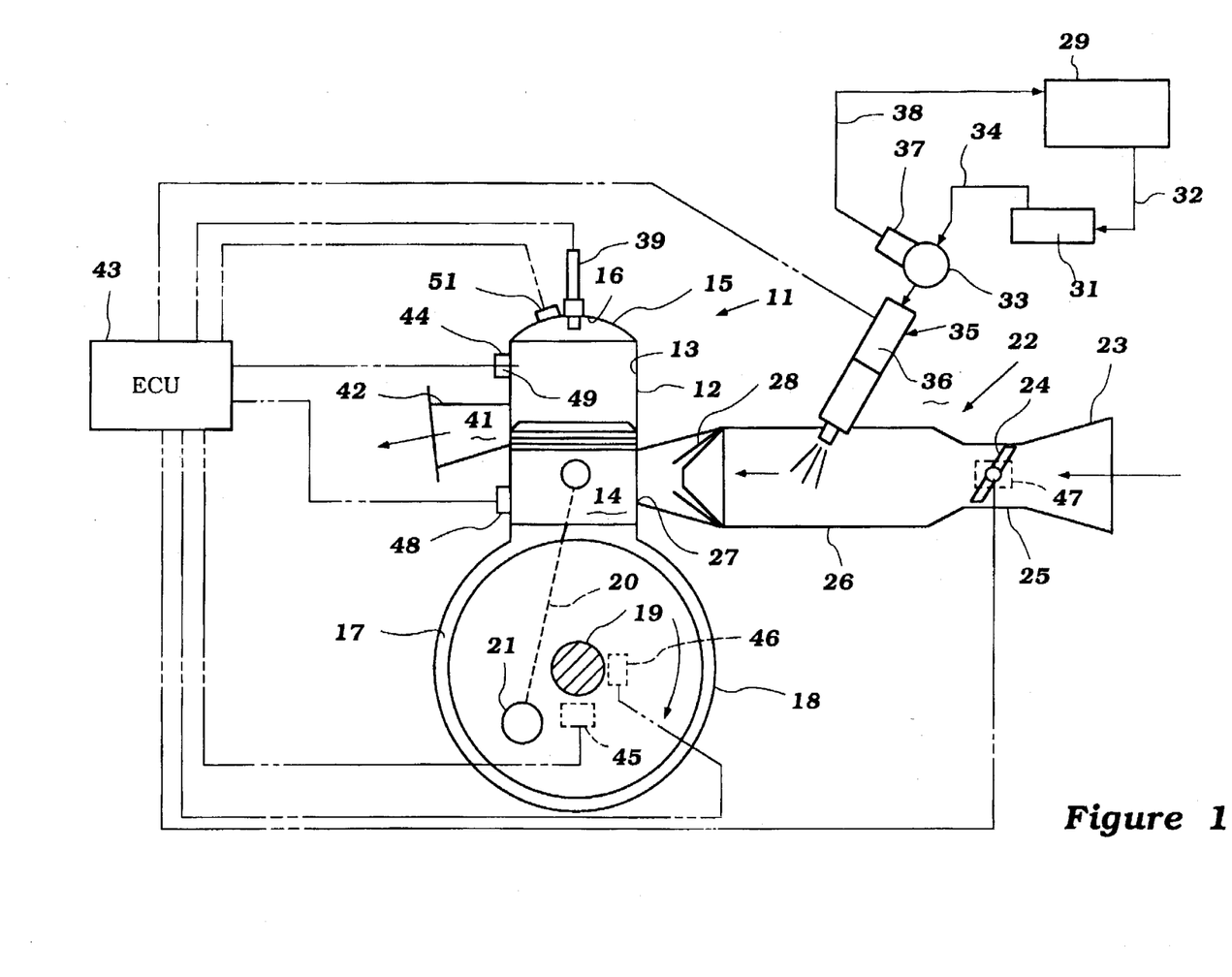
FIG. 1 is a partially schematic cross-sectional view taken through a single cylinder of a multiple cylinder internal combustion engine constructed and operated in accordance with an embodiment of the invention.

Referring first to FIG. 1, an internal combustion engine constructed and operated in accordance with the invention is shown partially in a schematic cross-sectional view and is indicated generally by the reference numeral 11. As will become apparent, the described construction is of an engine 11 which has only one cylinder, but it will be readily apparent to those skilled in the art that the invention is not limited to single-cylinder engines. The application of the inventive principle to multiple-cylinder engines of various configurations will be readily apparent to those skilled in the art. In addition, although the invention is described in conjunction with a reciprocating engine operating on a two-stroke crankcase compression principle, the invention also is applicable to engines operating on other cycles and rotary engines.

The engine 11 includes a cylinder block 12 which has a cylinder bore 13 in which a piston 14 reciprocates. A cylinder head 15 is affixed to the cylinder block 12 in a known manner and has a recess 16 that cooperates with the cylinder bore 13 and the head of the piston 14 to provide the combustion chamber for the engine. This combustion chamber varies cyclically during the reciprocation of the piston. The recess 16 will at times be referred to as the combustion chamber, since at top dead center condition, it forms the major portion of the clearance volume.

A crankcase chamber 17 is formed beneath the piston 14 by a skirt of the cylinder block 12 and a crankcase member 18 that is affixed thereto in a known manner. A crankshaft 19 having a throw 21 is rotatably journaled in the crankcase chamber 17 in a known manner. The piston 14 drives the crankshaft 19 through a connecting rod 20.

The crankcase chamber 17 is generally sealed from the atmosphere, and in multiple-cylinder engines, each crankcase chamber associated with a respective cylinder bore 13 is sealed from the others, as is well known in two-cycle-engine practice.

An induction and charge-forming system, indicated generally by the reference numeral 22, is provided for supplying a fuel and air charge to the crankcase chambers 17. This charge-forming system includes an atmospheric air inlet device 23 which draws atmospheric air in a known manner. This air inlet device 23 may include a silencing and/or filtering arrangement. A throttle valve 24 is provided in a throttle body 25 which connects the air inlet device 23 to an intake manifold runner 26. The throttle valve 24 is controlled by the operator in any suitable manner via a linkage or cable system.

The manifold runner 26 discharges the air charge admitted through the system thus far described to the crankcase chamber 17 through an inlet port 27 in which a reed-type check valve 28 is provided. The reed-type check valve 28 permits the flow of air into the crankcase chamber 17 when the piston 14 is moving upwardly in the cylinder bore 13. However, when the piston 14 moves downwardly to compress the charge, the reed-type valve 28 will close so as to preclude reverse flow.

The charge-forming system 22 also includes a fuel supply system and fuel charge former. This fuel supply system includes a fuel tank 29 which delivers fuel to a high-pressure fuel pump 31 through a conduit 32. The high-pressure fuel pump 31 in turn delivers fuel to a fuel rail 33 through a conduit 34. The fuel rail 33 is connected to a fuel injector 35 which may be of the electrically operated type and which includes a solenoid 36 for opening and closing the fuel control valve, as is well known in this art. The injector 35 injects into the manifold runner 26 in the illustrated embodiment.

The pressure at which the fuel is delivered to the fuel injector 36 is controlled by means of a pressure regulator 37 that is disposed in the fuel rail 33. Fuel pressure is controlled by returning excess fuel back to the fuel supply system, such as to the fuel tank 29 through a return conduit 38.

The fuel and air supply which is delivered to the crankcase chamber 17 by the induction and charge-forming system 22 is, as noted above, compressed in the crankcase chamber 17. This compressed charge is then transferred to the combustion chamber 16 through one or more scavenged passages which do not appear in FIG. 1. This charge is then further compressed in the combustion chamber 16 as the piston 14 continues its upward stroke. At an appropriate time, as will be described, a spark plug 39 mounted in the cylinder head 15 is fired so as to ignite this charge.

The burning charge expands and drives the piston 14 downwardly. Eventually an exhaust port 41 formed in the cylinder 13 will be opened, and the exhaust gases can exit through an exhaust manifold 42 for discharge to the atmosphere through an associated exhaust system (not shown).

The timing of the firing of the spark plug 39 and the timing and duration of fuel injection from the fuel injector 35 are controlled by an ECU, indicated generally by the reference numeral 43. Certain sensors of ambient and engine running conditions are provided for supplying information to the ECU 43 for its control strategy. Except for the knock sensor, indicated generally by the reference numeral 44, the other sensors which will be described are only typical of those which may be utilized in the control strategy. Those skilled in the art will readily understand how this invention, which deals primarily with knock control, can operate with known types of control systems.

The sensors involved include a crankcase position sensor 45, which provides a signal indicative of the angle of the crankshaft 19, as well as the speed of rotation of the crankshaft 19. In addition, an engine torque sensor 46 may be also supplied, which measures engine torque, for example, by measuring the pressure in the crankcase chamber 17 at specific crank angles.

A throttle position detector 47 is associated with the throttle valve 42 and is mounted in the throttle body 25 for providing a signal to the ECU indicative of operator demand, as indicated obviously by the position of the throttle valve 24.

An engine temperature sensor 48 is mounted in the cylinder block 12 in a portion of the cooling jacket of the engine for providing a signal to the ECU 44 that indicates the engine operating temperature. Also, if a feedback control system is desired, an oxygen sensor 49 may be provided in either the cylinder bore 13 or in the exhaust port 41 so as to provide a signal that is indicative of the fuel-air ratio supplied to the engine. In addition, an in-cylinder pressure sensor 51 may be mounted in the cylinder head 15 for sensing the actual pressure in the combustion chamber.

As has been noted, the basic system for control of the fuel injector 35 and spark plug 39 may be of any known type. Thus, and as has already been noted, those sensors described may be considered to be typical of those sensors which are employed to operate the engine management system.

Figure 2:
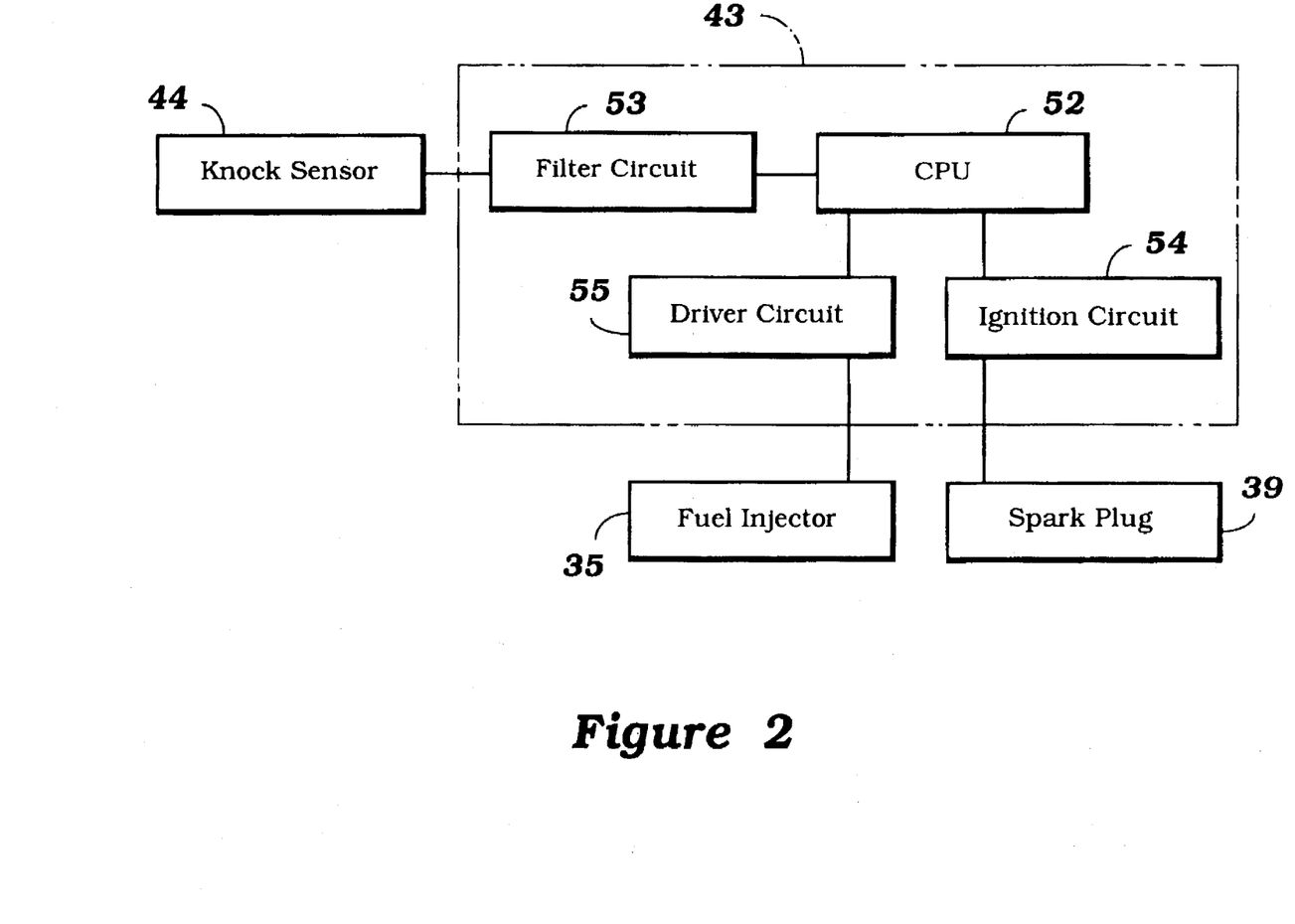
FIG. 2 is a block diagram showing some of the components of the engine knock control for the engine shown in FIG. 1.

Referring specifically to FIG. 2, the ECU 43 is shown, and it includes a CPU 52 that receives the output signals from the sensors through suitable interfaces. Only the knock sensor 44 and an associated filter circuit 53 have been illustrated in this figure. Obviously, however, the other sensors described and even further sensors may also be incorporated and supply information to the CPU 52 for the control strategy.

The CPU 52 supplies a triggering circuit to an ignition circuit 54 of the ECU 43, which in turn, fires the spark plugs 39 through a coil (not shown).

In a similar manner, the CPU outputs a signal to a driver circuit 55 of the ECU 43. This driver circuit 55 outputs a pulse signal to the fuel injector 35, and specifically its solenoid coil 36 for energizing and de-energizing it to control the timing and duration of fuel injection.

As has been noted, the invention deals primarily with the knock retardation features of the control system. Conventionally, the way knock is eliminated is that when the knock sensor 44 outputs a signal, the CPU 52 will delay the spark timing. This condition and the problems caused by it may be understood by reference to FIG. 3.

Figure 3:
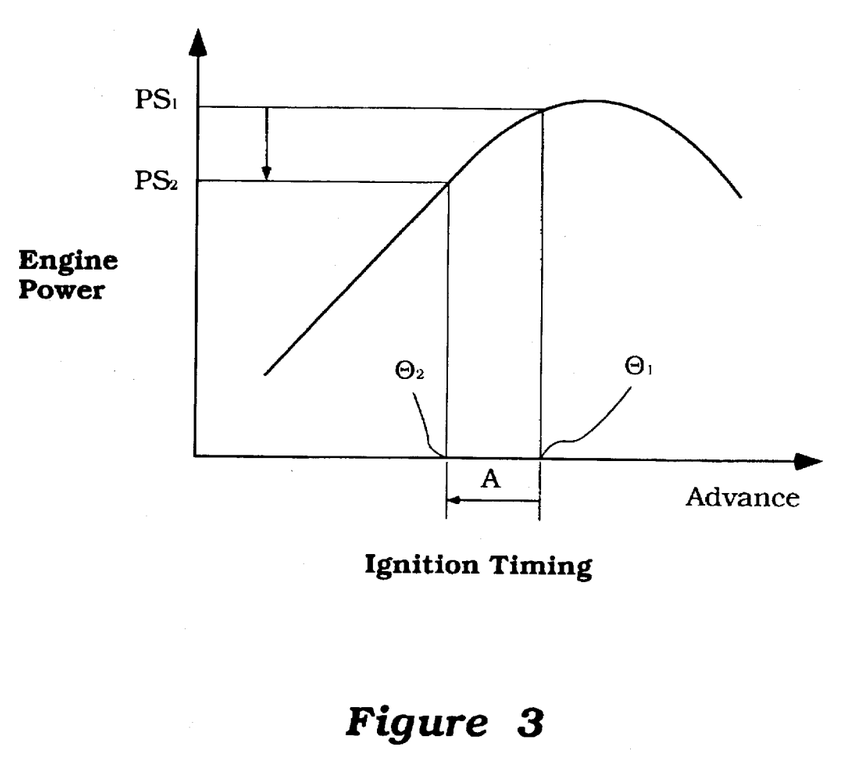
FIG. 3 is a graphical view showing the engine power output in relation to ignition timing advance angle and shows the effect of retardation of the spark advance.

FIG. 3 is a graphical view showing the relation of spark advanced to engine power output. As may be seen, at a given engine running condition, the spark advance θ1 will provide an engine power output PS1. However, in accordance with the spark anti-knock control, if the knocking condition is sensed, the advance angle is retarded an amount A to the spark advance point θ2. As a result, the engine power will fall the amount B to the level PS2. This provides a disconcerting feeling to the operator, and may cause him to further open the throttle valve to stabilize this condition. This can either further aggravate the knock situation or can result in an over-power situation when the spark is returned to normal.

Therefore, in accordance with the invention, an arrangement is provided so as to produce an increase in power when the spark timing is advanced so as to maintain the power at a substantially constant level. The way that this is accomplished may be understood by reference to FIG. 4, which shows the fuel supply amount that was supplied to the engine at the time to achieve the power PS1 when the spark timing was at the angle θ1.

Figure 4:
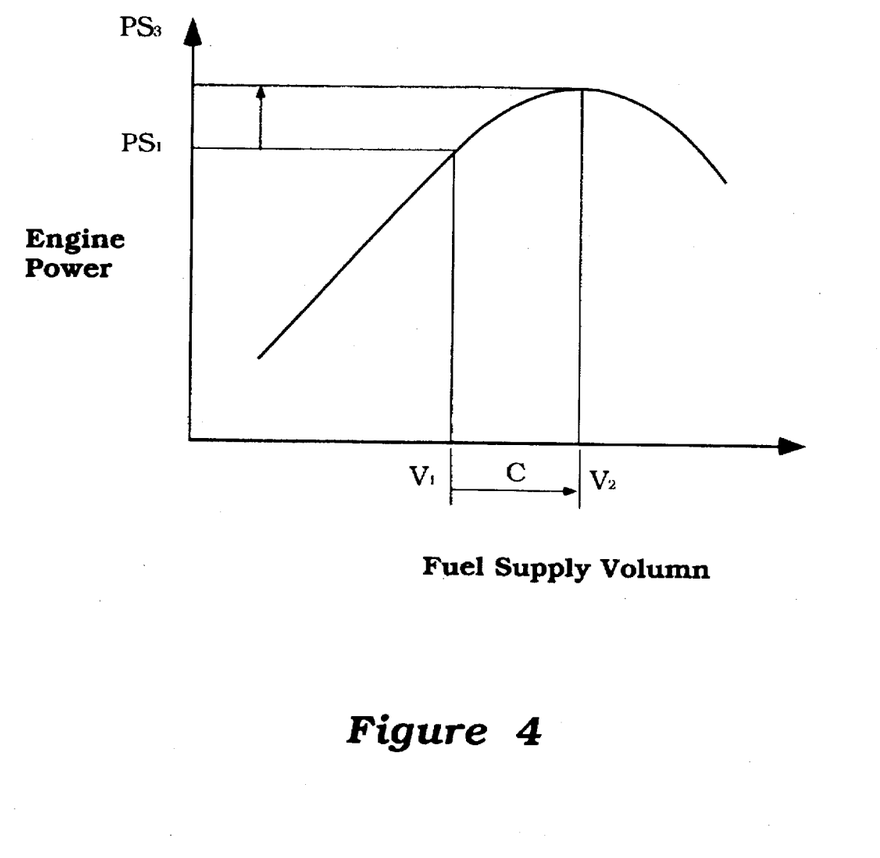
FIG. 4 is a graphical view showing the effect of the amount of fuel supplied to the engine on the engine power output.
Figure 6:
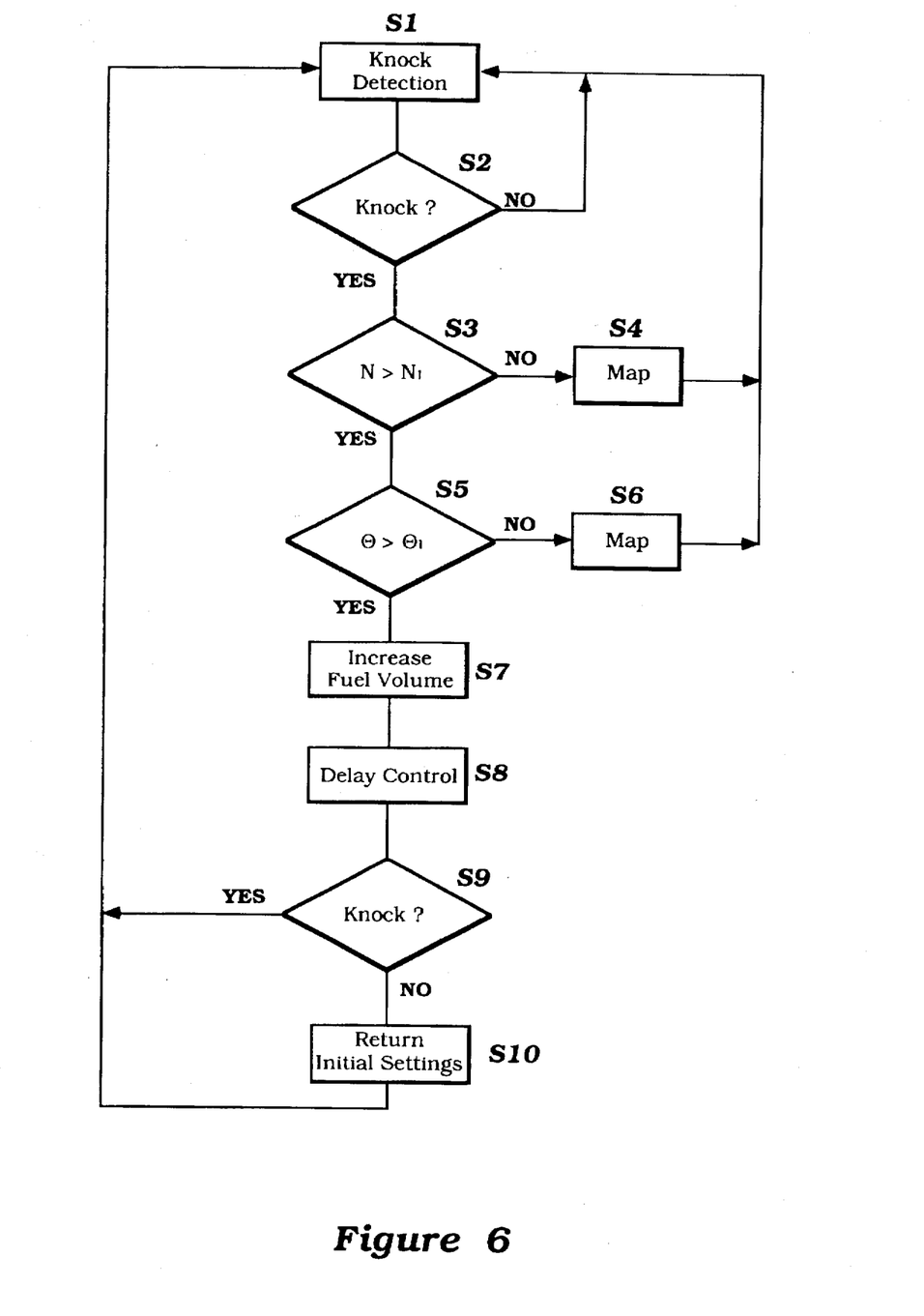
FIG. 6 is a graphical view showing the control routine in accordance with the invention.

The system operates in connection with a control strategy, which will be described later by reference to FIG. 6, and in which the fuel supply volume is increased from the volume v1 that previously existed by the increased amount C to the volume v2. This would have a tendency to increase the power, assuming the spark advance were not retarded, from the level PS1 to a new higher level PS3. The amount of increase in power output is determined experimentally so as to provide a substantially constant power, even though the spark timing is retarded.

Figure 5:
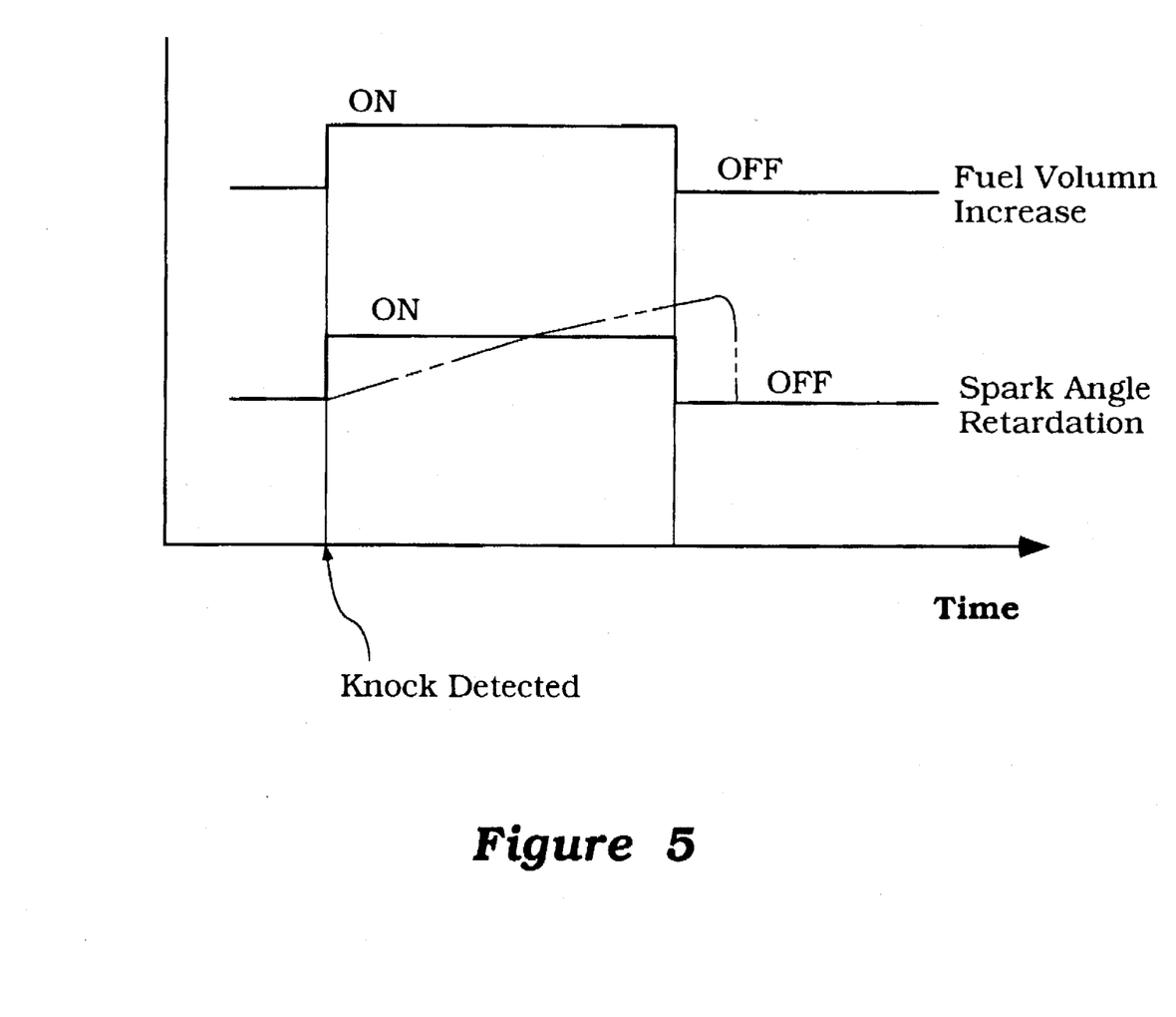
FIG. 5 is a graphical view showing the control routine in accordance with the invention by indicating the fuel volume amount control, spark retardation control, and time.

The strategy by which this is accomplished will now be described by reference to FIGS. 5 and 6. FIG. 5 is a graphical view showing the correction amounts or conditions for both spark advance retardation and fuel volume increase with respect to time, while FIG. 6 shows the control routine. This control routine will now be described by particular reference to this figure.

The program begins at the step S1 so as to read the output from the knock sensor 44. The program then, at the step S2, determines if a knocking condition exists. If it does not, the program repeats back.

If, however, at the step S2 it is determined that a knocking condition exists, then the program moves to the step S3 to determine if the engine speed N is above a predetermined engine speed $N_1$. The speed $N_1$ is a speed above which the decrease in spark advance would cause a significant change in engine power that would be detrimental. If at the step S3 the engine speed N is not determined to be in excess of the speed $N_1$, the program moves to the step S4 so as to return to the map control for fuel injection amount and to initiate the necessary spark retardation to preclude knocking.

If, however, at the step S3 the engine speed is greater than the engine speed $N_1$, then the program moves to the step S5 to compare throttle valve position θ with a predetermined throttle valve position θ1. The value at θ1 is a value that would be great enough that if the spark advance is retarded without increasing the fuel amount, undesirable engine running would result. If the throttle angle is not greater than this, then the program moves to the step S6 so as to again resort to the map for fuel injection amount and to initiate the appropriate spark retardation to eliminate the knocking.

If, however, the answers are responses that the steps S3 and S5 are both yes, then the program moves to the step S7 so as to increase the fuel amount volume. At the same time, the spark angle is retarded. This is shown by the solid line views of FIG. 5. The program then moves to the step S8 so as to set a delay time before any changes are made. This time is a relatively short time period and is chosen so as to permit engine stabilization to occur.

The program then moves to the step S9 to determine if the knocking condition still persists. If it does, the program moves back to the step S1 and through the control routine. This will provide a still further spark retardation and, if necessary, fuel injection amount increase.

If, however, at the step S9 it is determined that the knocking condition has been cured, then the program moves to the step S10 so as to return both the fuel injection amount and the spark timing to those required by the normal control strategy map of the engine control.

As has been noted, FIG. 5 shows a control routine wherein the spark retardation occurs in a single, rather large step. Another possible control routine will be to change the spark advance, not in a single step, but gradually in an increased amount until the knock detection is discontinued. Then the spark retardation is still held for a short time period when the fuel injection amount is decreased. Finally, the spark is returned to normal after the slight time delay. This can provide smoother transition under some running conditions.

Figure 7:
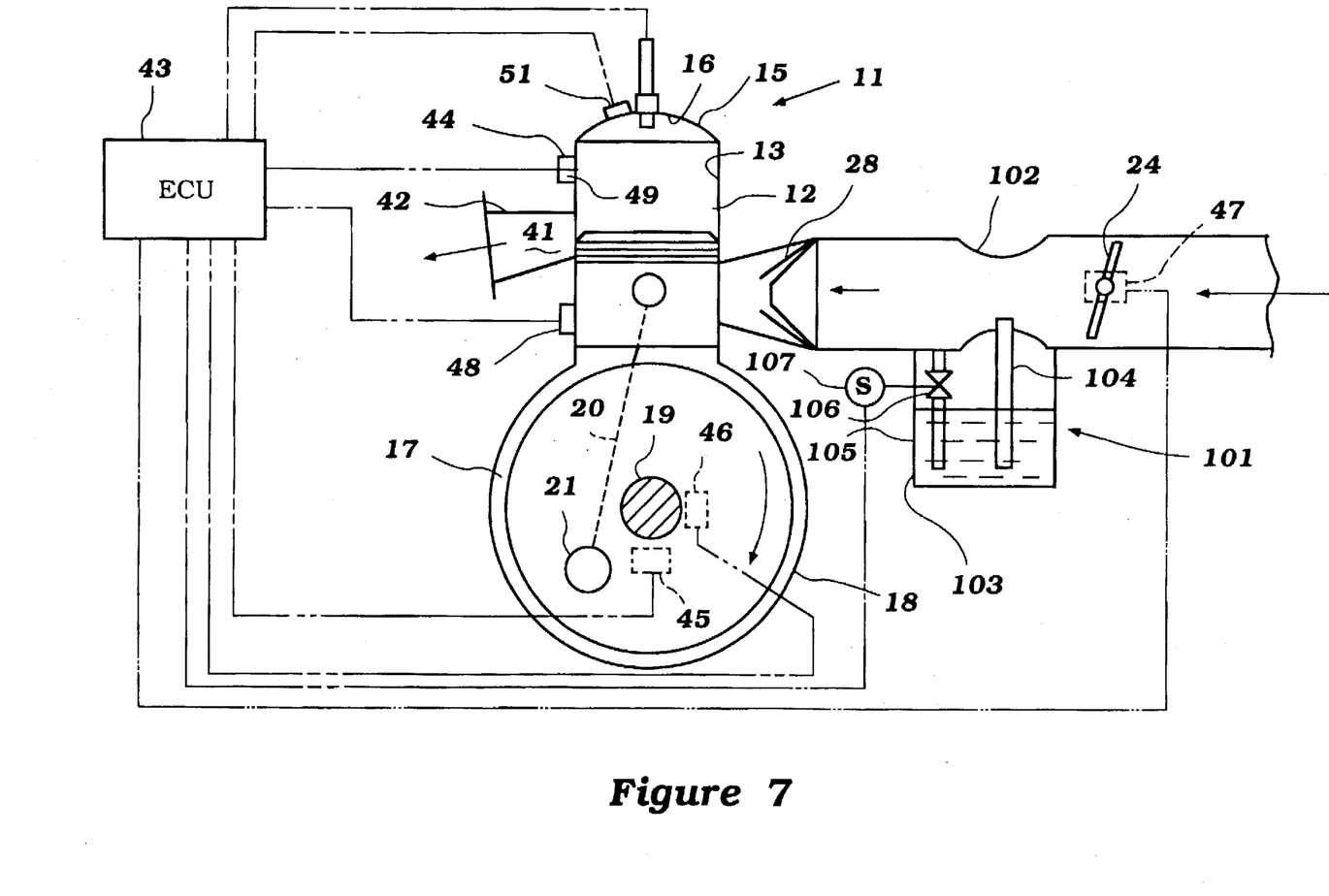
FIG. 7 is a partially schematic cross-sectional view, in part similar to FIG. 1, and shows another embodiment of the invention.

In the embodiment of the invention as thus far described, the charge forming system has employed a manifold-type fuel injector, i.e., the fuel injector 35. Although the invention has been described in conjunction with manifold-type fuel injection, it should be readily apparent that it may be equally as well practiced with other types of fuel injection and other injector locations. For example, the invention can be utilized with crankcase injection, scavenge passage injection or direct injection. In addition, the invention can be utilized with other types of charge formers and FIG. 7 shows an embodiment employing a carburetor, indicated generally by the reference numeral 101 rather than a fuel injector.

Since the only difference between this embodiment and the earlier embodiment is the type of charge former, the basic components of the engine have been identified by the same reference numerals and will not be described again. In this embodiment, the throttle valve 24 and throttle position sensor 47 are illustrated as being disposed upstream of the venturi section 102 of the carburetor 101. Of course, the invention can also be utilized with the more conventional type of arrangement where the throttle valve 24 is positioned downstream of the venturi section 102.

The carburetor 101 in addition to having the venturi section 102 is provided with a float bowl 103 in which a level of fuel is maintained by a float-operated valve (not shown) in a well known manner. A main discharge 104 depends into the float bowl 103 and sprays fuel into the carburetor at the venturi section 102 through a suitable discharge nozzle. In addition, idle and transition circuits may be employed with the carburetor 101.

In addition, there is provided an enrichment circuit 105 in which a solenoid operated flow control valve 106 is positioned. A solenoid 107 for the valve 106 is controlled by the ECU 43 in a manner as previously described. That is, the solenoid 107 and valve 106 are energized at the step S7 of FIG. 6 when knocking prevention is initiated by retardation of the spark advance. Hence, in addition to the normal fuel flow through the carburetor 101 there will be supplemental fuel flow so as to provide the increase in power to ensure smooth running.

It should be apparent to those skilled in the art that the described embodiments are very effective in providing good knocking control and excellent driveability. Of course, the embodiments disclosed are preferred embodiments and various changes and modifications may be made without departing from the spirit and scope of the invention, as defined by the appended claims.

What is claimed is:

1. An internal combustion engine comprised of a combustion chamber, an air/fuel charging system for delivering an air/fuel charge to said combustion chamber for combustion therein, an ignition system for igniting the charge in said combustion chamber, means for sensing an engine operating condition, means for retarding the firing of the ignition system when the engine operating condition is sensed, and means for concurrently increasing the fuel supplied by the fuel/air charge forming system to the combustion chamber when the ignition is retarded in response to the condition for maintaining substantially constant power output and if at least one of the engine speed is above a predetermined speed and a throttle in the charging system is open more than a predetermined amount exists.

2. An internal combustion engine as set forth in claim 1, wherein the sensed engine condition comprises knocking and the sensor therefor comprises a knock sensor.

3. An internal combustion engine as set forth in claim 1, wherein the fuel increase is supplied only in the event the engine speed is above a predetermined engine speed.

4. An internal combustion engine as set forth in claim 1, wherein the means for supplying additional fuel supplies additional fuel only if a throttle opening of the air/fuel charging system is greater than a predetermined amount.

5. An internal combustion engine as set forth in claim 4, wherein the additional fuel is supplied only in the event the engine speed is also above a predetermined amount.

6. A method of operating an internal combustion engine comprised of a combustion chamber, an air/fuel charging system for delivering an air/fuel charge to said combustion chamber for combustion therein, an ignition system for igniting the charge in said combustion chamber, said method comprising the steps of sensing an engine operating condition, retarding the firing of the ignition system when the engine operating condition is sensed, and concurrently increasing the fuel supplied by the fuel/air charge forming system to the combustion chamber when the ignition is retarded in response to the condition for maintaining substantially constant power output and if at least one of the engine speed is above a predetermined speed and a throttle in the charging system is open more than a predetermined amount exists.

7. A method of operating an internal combustion engine as set forth in claim 6, wherein the sensed engine condition comprises knocking.

8. A method of operating an internal combustion engine as set forth in claim 6, wherein the fuel increase is supplied only in the event the engine speed is above a predetermined engine speed.

9. A method of operating an internal combustion engine as set forth in claim 6, wherein the additional fuel is supplied only if the throttle opening of the air fuel/charging system is greater than a predetermined amount.

10. A method of operating an internal combustion engine as set forth in claim 9, wherein the additional fuel is supplied only in the event the engine speed is also above a predetermined amount.

* * * * *